United States Patent
Gupta et al.

(10) Patent No.: US 11,150,840 B2
(45) Date of Patent: Oct. 19, 2021

(54) PINNING SELECTED VOLUMES WITHIN A HETEROGENEOUS CACHE

(71) Applicant: International Business Machines Corporation, Armonk, NY (US)

(72) Inventors: Lokesh M. Gupta, Tucson, AZ (US); Matthew G. Borlick, Tucson, AZ (US); Kevin J. Ash, Tucson, AZ (US); Beth A. Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 16/785,632

(22) Filed: Feb. 9, 2020

(65) Prior Publication Data

US 2021/0247930 A1    Aug. 12, 2021

(51) Int. Cl.
*G06F 12/00* (2006.01)
*G06F 3/06* (2006.01)
(Continued)

(52) U.S. Cl.
CPC .......... *G06F 3/0659* (2013.01); *G06F 3/0604* (2013.01); *G06F 3/067* (2013.01); *G06F 3/0617* (2013.01); *G06F 3/0653* (2013.01); *G06F 3/0656* (2013.01); *G06F 3/0683* (2013.01); *G06F 12/0862* (2013.01); *G06F 12/0893* (2013.01); *G06F 12/123* (2013.01); *G06F 2212/22* (2013.01); *G06F 2212/225* (2013.01);
(Continued)

(58) Field of Classification Search
CPC ............... G06F 3/0656; G06F 2212/22; G06F 2212/225; G06F 2212/283; G06F 2212/60; G06F 12/0862; G06F 12/123; G06F 12/0893; G06F 2212/6022
See application file for complete search history.

(56) References Cited

U.S. PATENT DOCUMENTS 8,959,307 B1 * 2/2015 Bruce ................... G06F 3/0688
                                                      711/170
8,996,807 B2 * 3/2015 Joshi ................... G06F 9/45558
                                                      711/117
(Continued)

OTHER PUBLICATIONS

Meyer, C., et al.,"Dynamic and Transparent Data Tiering for In-Memory Databases in Mixed Workload Environments," In ADMS@ VLDB (pp. 37-48), 2015.
(Continued)

*Primary Examiner* — John A Lane
(74) *Attorney, Agent, or Firm* — Nelson IP; Daniel P. Nelson

(57) ABSTRACT

A method for pinning selected volumes within a heterogeneous cache is disclosed. The method maintains a heterogeneous cache made up of a higher performance portion and a lower performance portion. A list of pinned volumes is received that are provided higher priority than other volumes within the heterogeneous cache. The method dedicates, within the lower performance portion, a storage area to accommodate the pinned volumes and prestages the pinned volumes within the storage area. In certain embodiments, an LRU list is maintained that indicates an order in which storage elements of the pinned volumes are demoted from the storage area. A corresponding system and computer program product are also disclosed.

20 Claims, 19 Drawing Sheets

(51) Int. Cl.
  *G06F 12/0893* (2016.01)
  *G06F 12/123* (2016.01)
  *G06F 12/0862* (2016.01)

(52) U.S. Cl.
  CPC .... *G06F 2212/283* (2013.01); *G06F 2212/60* (2013.01); *G06F 2212/6022* (2013.01)

(56) References Cited

U.S. PATENT DOCUMENTS

| | | | |
|---|---|---|---|
| 9,235,531 | B2 | 1/2016 | Celis et al. |
| 9,436,392 | B1 | 9/2016 | Shetty et al. |
| 10,185,501 | B2 | 1/2019 | Anantaraman et al. |
| 2012/0290785 | A1* | 11/2012 | Ergan ............ G06F 3/061 711/112 |
| 2013/0297887 | A1* | 11/2013 | Woodward ......... G06F 12/126 711/137 |
| 2015/0205535 | A1* | 7/2015 | Joshi ............... G06F 3/0613 711/103 |
| 2015/0286580 | A1* | 10/2015 | Benhase ........... G06F 12/0897 711/122 |
| 2016/0342357 | A1 | 11/2016 | Ramamoorthy et al. |
| 2017/0285995 | A1* | 10/2017 | Ramamoorthy .... G06F 12/0802 |
| 2020/0242088 | A1* | 7/2020 | Wu ................. G06F 16/188 |

OTHER PUBLICATIONS

Hoseinzadeh, M., "A Survey on Tiering and Caching in High-Performance Storage Systems." arXiv preprint arXiv:1904.11560, Apr. 2019.

Rajasekaran, S., et al., "Multi-Cache: Dynamic, Efficient Partitioning for Multi-Tier Caches in Consolidated VM Environments," In 2016 IEEE International Conference on Cloud Engineering (IC2E) (pp. 182-191). IEEE, Apr. 2016.

* cited by examiner

PINNING SELECTED VOLUMES WITHIN A HETEROGENEOUS CACHE

BACKGROUND

Field of the Invention

This invention relates to systems and methods for implementing a cache made up of heterogeneous memory types.

Background of the Invention

In the field of computing, a "cache" typically refers to a small, fast memory or storage device used to store data or instructions that were accessed recently, are accessed frequently, or are likely to be accessed in the future. Reading from or writing to a cache is typically cheaper (in terms of access time and/or resource utilization) than accessing other memory or storage devices. Once data is stored in cache, it can be accessed in cache instead of re-fetching and/or re-computing the data, saving both time and resources.

SUMMARY

The invention has been developed in response to the present state of the art and, in particular, in response to the problems and needs in the art that have not yet been fully solved by currently available systems and methods. Accordingly, systems and methods have been developed to pin selected volumes within a heterogeneous cache. The features and advantages of the invention will become more fully apparent from the following description and appended claims, or may be learned by practice of the invention as set forth hereinafter.

Consistent with the foregoing, a method for pinning selected volumes within a heterogeneous cache is disclosed. The method maintains a heterogeneous cache made up of a higher performance portion and a lower performance portion. A list of pinned volumes is received that are provided higher priority than other volumes within the heterogeneous cache. The method dedicates, within the lower performance portion, a storage area to accommodate the pinned volumes and prestages the pinned volumes within the storage area. In certain embodiments, an LRU list is maintained that indicates an order in which storage elements of the pinned volumes are demoted from the storage area.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
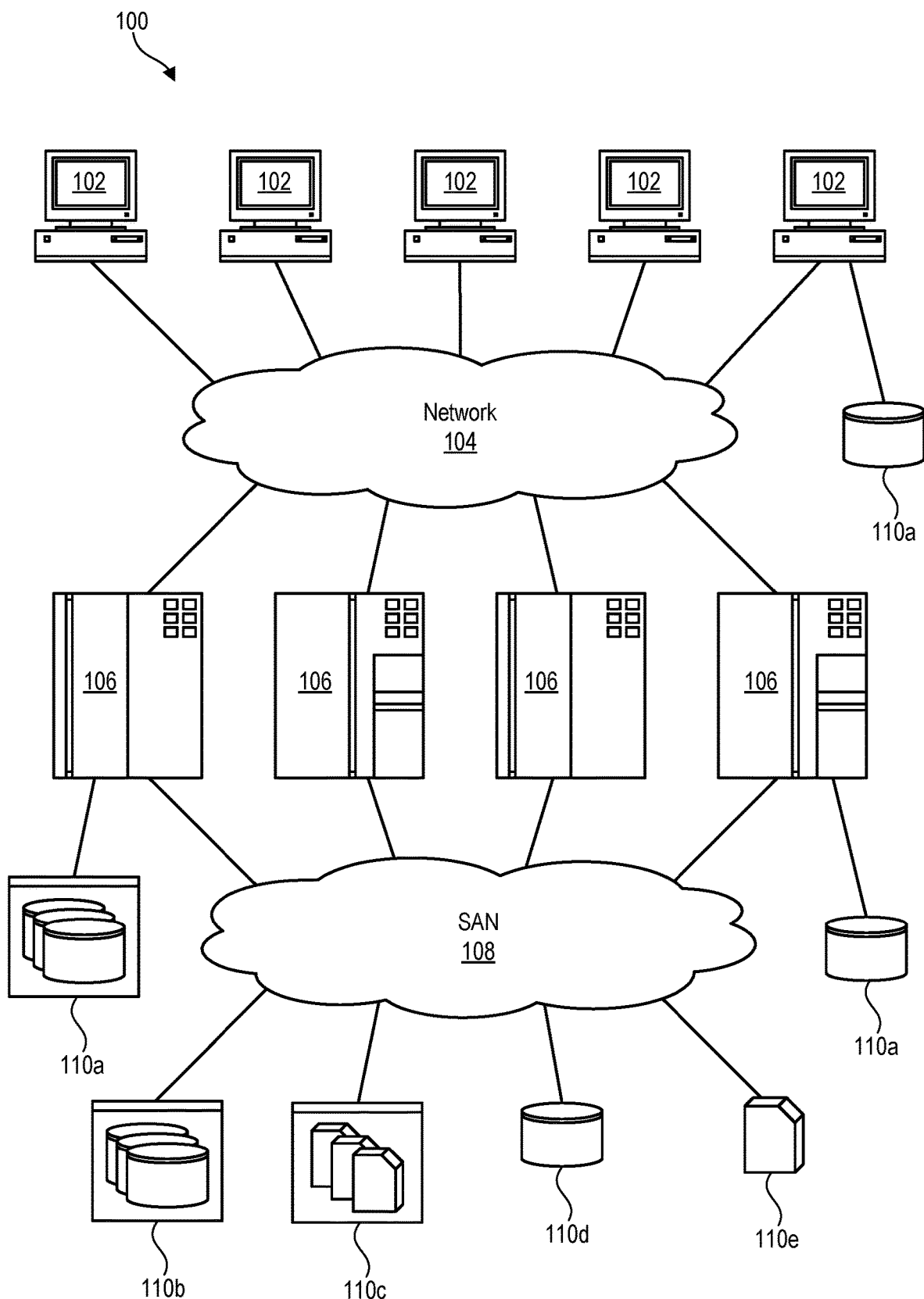
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host system 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
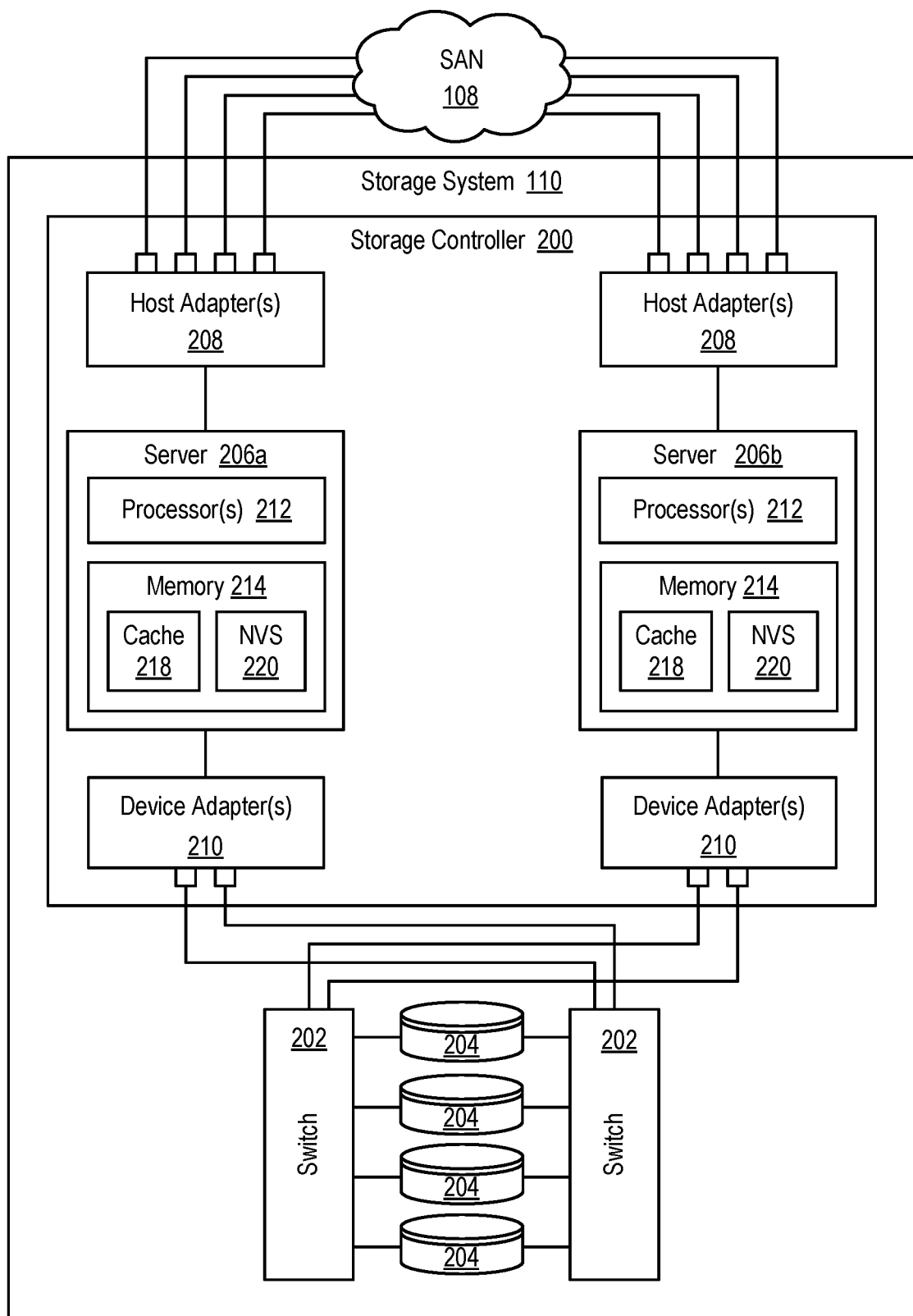
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host systems 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host system 106 (e.g., an open system or mainframe server 106) performs a read operation, the server 206 that performs the read may fetch data from the storages drives 204 and save it in its cache 218 in the event it is required again. If the data is requested again by a host system 106, the server 206 may fetch the data from the cache 218 instead of fetching it from the storage drives 204, saving both time and resources. Similarly, when a host system 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed memory in the opposite server 206.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
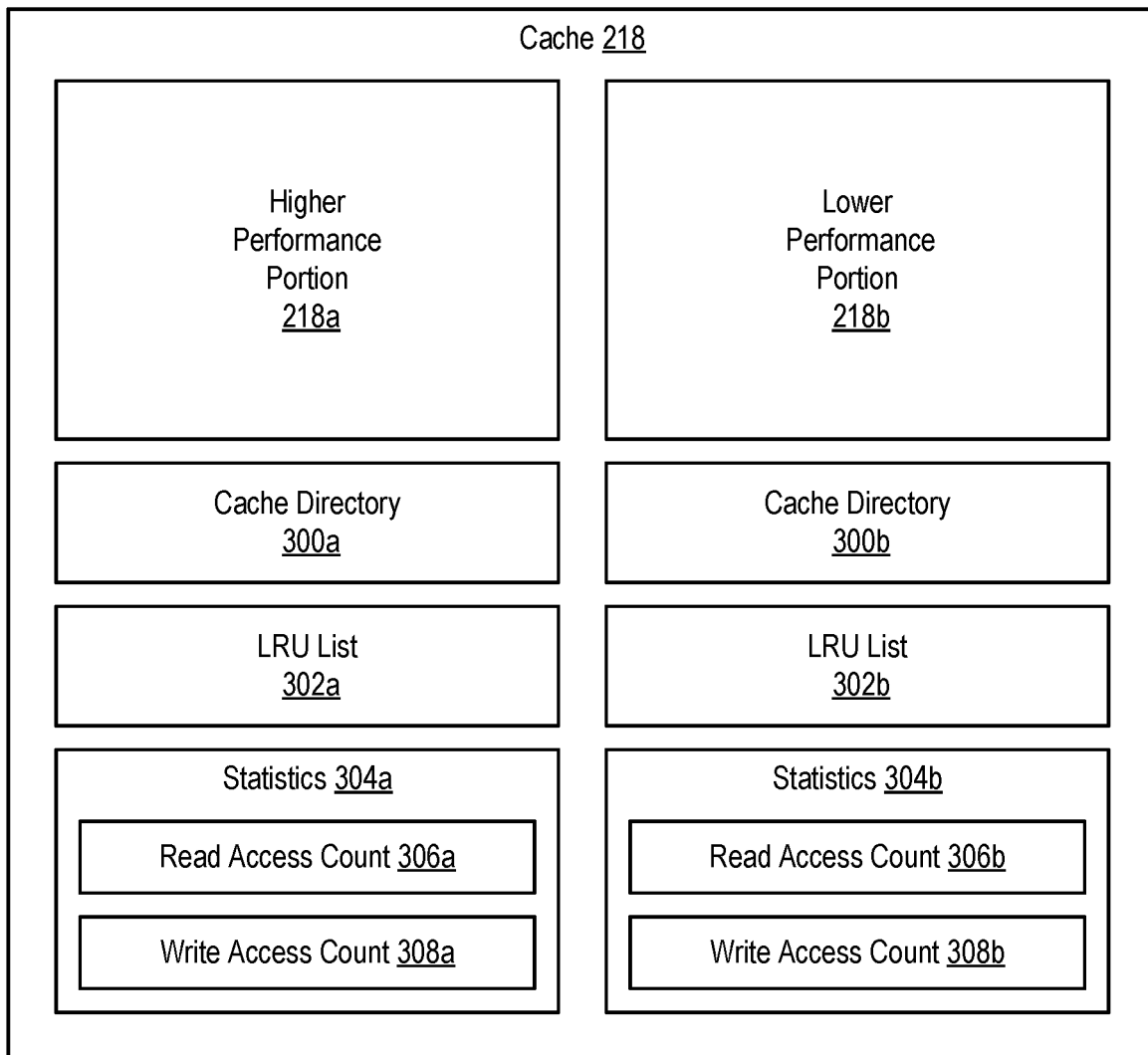
FIG. 3 is a high-level block diagram showing a cache comprising a higher performance portion (e.g., DRAM cache) and a lower performance portion (e.g., SCM cache)

Referring to FIG. 3, as previously mentioned, flash memory and other solid-state memory devices can potentially create caches with much larger storage capacities than those using more expensive memory such as DRAM cache. For example, storage class memory (SCM), a type of non-volatile NAND flash memory, provides access speeds that are much higher than solid state drives (SSDs). SCM is much cheaper than DRAM but has higher latency than DRAM (microseconds compared to nanoseconds). Because SCM may use flash memory to store data, SCM may exhibit some of the same limitations and deficiencies as flash memory, such as write-cycle limits and issues with data fragmentation. Because of its potential to create caches with much larger storage capacities, systems and methods are needed to effectively incorporate flash memory, such as SCM, into cache. Ideally, such systems and method will take into account the limitations and deficiencies of flash memory, such as write-cycle limits and data fragmentation issues.

FIG. 3 is a high-level block diagram showing a heterogeneous cache 218 (i.e., a cache 218 made up of heterogeneous memory types) comprising a higher performance portion 218a and a lower performance portion 218b. In certain embodiments, the higher performance portion 218a is made up of DRAM memory and the lower performance portion 218b is made up of SCM memory, although neither are limited to these types of memory. The higher performance portion 218a and lower performance portion 218b may be used together to provide a cache 218 within a storage system 110 such as the IBM DS8000™ enterprise storage system. Because memory making up the lower performance portion 218b is likely cheaper than memory making up the higher performance portion 218a, the lower performance portion 218b may be larger, perhaps much larger, than the higher performance portion 218a.

As shown, the higher performance portion 218a may have associated therewith a cache directory 300a, an LRU (least recently used) list 302a, and statistics 304a. The cache directory 300a may record which data elements are stored in the higher performance portion 218a and where they are stored. The LRU list 302a may be used to determine which data element in the higher performance portion 218a is the least recently used. The statistics 304 may include a read access count 306a and a write access count 308a for each data element (e.g., track) that resides in the higher performance portion 218a. The read access count 306 may be incremented each time the data element is read in the higher performance portion 218a. The write access count 308 may be incremented each time the data element is modified in the higher performance portion 218a.

Similarly, the lower performance portion 218b may also include a cache directory 300b, LRU list 302b, and statistics 304*b*. The cache directory 300*b* may record which data elements are stored in the lower performance portion 218*b* and where they are stored. The LRU list 302*b* may be used to determine which data element is the least recently used in the lower performance portion 218*b*. The statistics 304*b* may include a read access count 306*b* and write access count 308*b* for each data element (e.g., track) in the lower performance portion 218*b*. The read access count 306*b* may be incremented each time the corresponding data element is read in the lower performance portion 218*b*. The write access count 308*b* may be incremented each time the corresponding data element is modified in the lower performance portion 218*b*.

Figure 4:
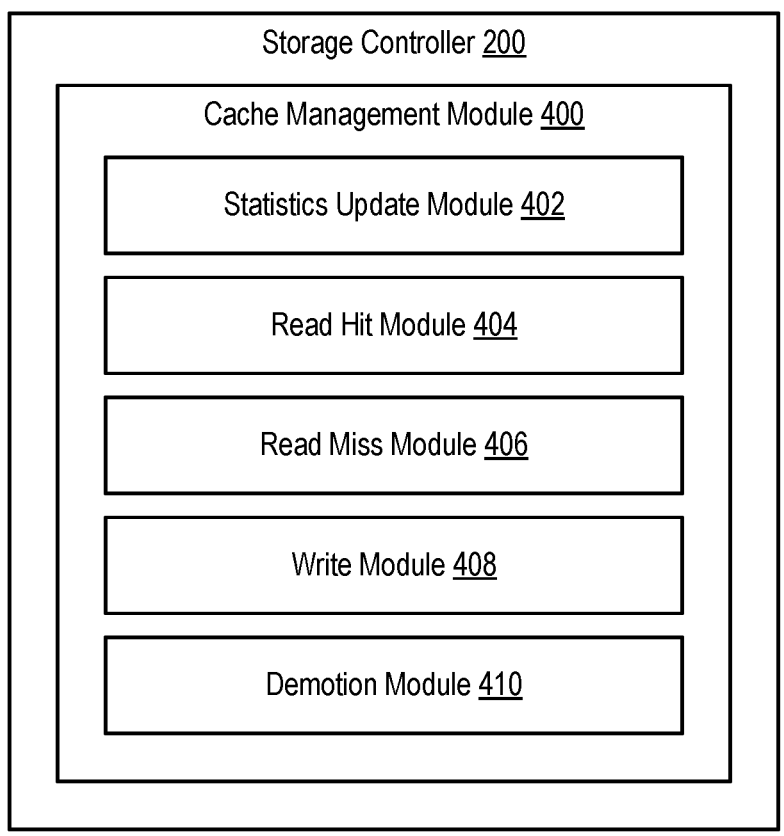
FIG. 4 is a high-level block diagram showing a cache management module in accordance with the invention.

Referring to FIG. 4, in certain embodiments, a cache management module 400 may be used to manage a heterogeneous cache 218 such as that illustrated in FIG. 3. Such a cache management module 400 may be hosted within the storage controller 200. The cache management module 400 may include various sub-modules to provide various features and functions. These modules may be implemented in hardware, software, firmware, or combinations thereof. The cache management module 400 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the cache management module 400 includes one or more of a statistics update module 402, read hit module 404, read miss module 406, write module 408, and demotion module 410. The statistics update module 402 maintains the statistics 304 associated with the heterogeneous cache 218. For example, each time a data element is read in the heterogeneous cache 218, the statistics update module 402 updates the associated read access count 306. Similarly, each time a data element is updated in the heterogeneous cache 218, the statistics update module 402 updates the associated write access count 308.

The read hit module 404 performs various actions when a read hit occurs in the heterogeneous cache 218. This may include either a read hit in the higher performance portion 218*a* or a read hit in the lower performance portion 218*b*. Several methods 500, 600, 700 that may be executed by the read hit module 404 will be discussed in association with FIGS. 5 through 7. By contrast, the read miss module 406 may perform various actions when a read miss occurs in the heterogeneous cache 218. One embodiment of a method 800 that may be executed by the read miss module 406 will be discussed in association with FIG. 8.

The write module 408 may perform various actions when data elements are updated in the heterogeneous cache 218. One embodiment of a method 900 that may be executed by the write module 408 will be discussed in association with FIG. 9. The demotion module 410, by contrast, may perform actions associated with demoting data elements from the heterogeneous cache 218 in order to clear storage space in the heterogeneous cache 218. Various methods 1000, 1100 that may be executed by the demotion module 410 will be discussed in association with FIGS. 10 and 11.

Figure 5:
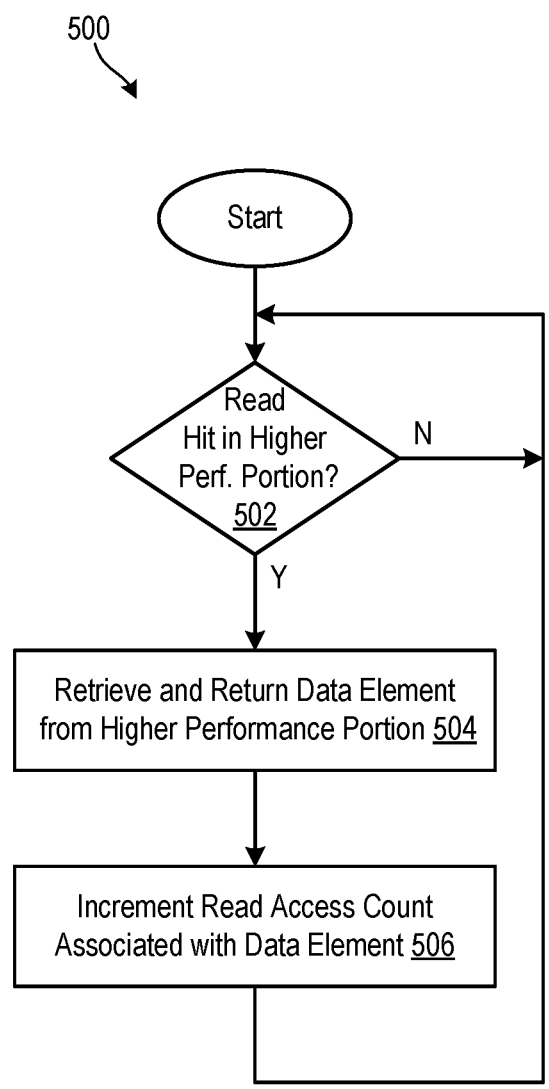
FIG. 5 is a flow diagram showing one embodiment of a method that may be executed in response to a read hit in the higher performance portion.

Referring to FIG. 5, one embodiment of a method 500 that may be executed in response to a read hit in the higher performance portion 218*a* of the heterogeneous cache 218 is illustrated. As shown, the method 500 determines 502 whether a read hit occurred in the higher performance portion 218*a*. That is, the method 500 determines 502 whether, in response to a read I/O request, a data element associated with the read I/O request was found in the higher performance portion 218*a*. If so, the method 500 retrieves 504 and returns 504 the data element from the higher performance portion 218*a* to an originator of the read request. The method 500 increments 506 the read access count 306*a* associated with the data element in response to the read hit.

Figure 6:
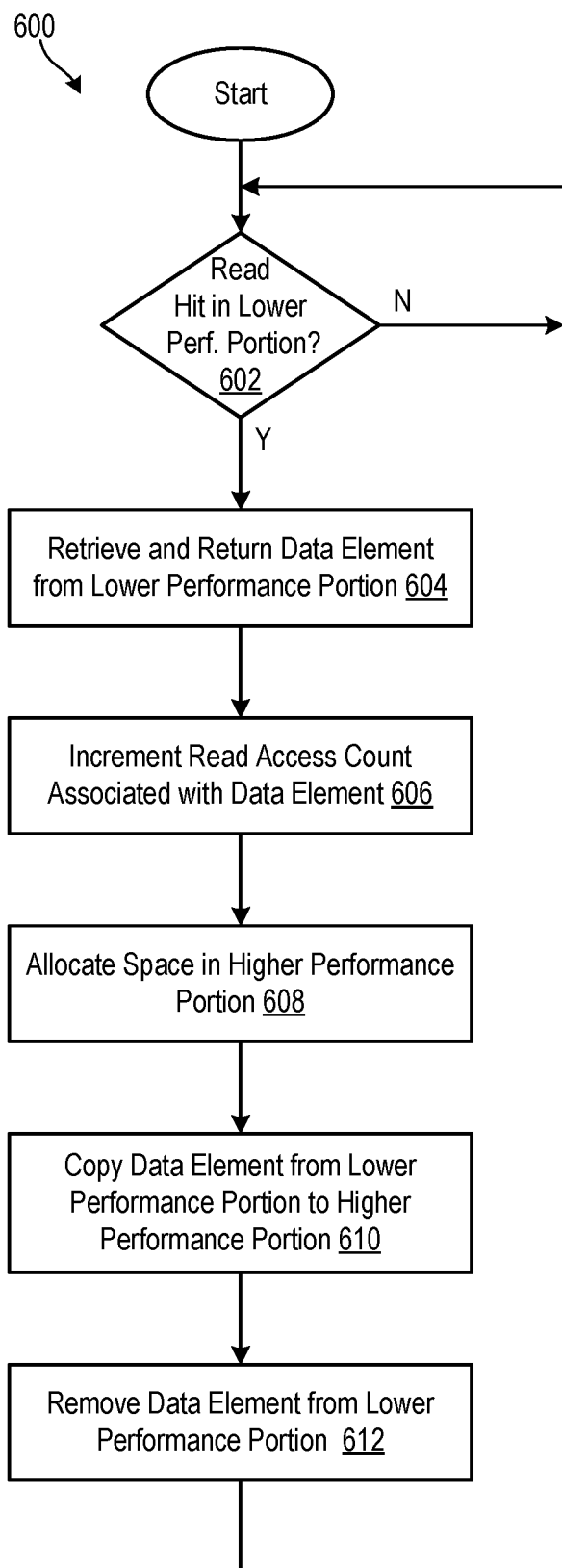
FIG. 6 is a flow diagram showing one embodiment of a method that may be executed in response to a read hit in the lower performance portion.

Referring to FIG. 6, one embodiment of a method 600 that may be executed in response to a read hit in the lower performance portion 218*b* is illustrated. As shown, the method 600 determines 602 whether a read hit occurred in the lower performance portion 218*b* of the heterogeneous cache 218. If so, the method 600 retrieves 604 and returns 604 a data element associated with the read request from the lower performance portion 218*b* to an originator of the read request. The method 600 then increments 606 the read access count 306*b* associated with the data element.

In response to the read hit, the method 600 also allocates 608 space in the higher performance portion 218*a* that is sufficient to accommodate the data element. In certain embodiments, this may include clearing space in the higher performance portion 218*a* by demoting a least recently used data element from the higher performance portion 218*a*. The method 600 then copies 610 the data element associated with the read request from the lower performance portion 218*b* to the higher performance portion 218*a*. The data element may then be removed 612 from the lower performance portion 218*b*. This may leave a single copy of the data element in the higher performance portion 218*a*.

Figure 7:
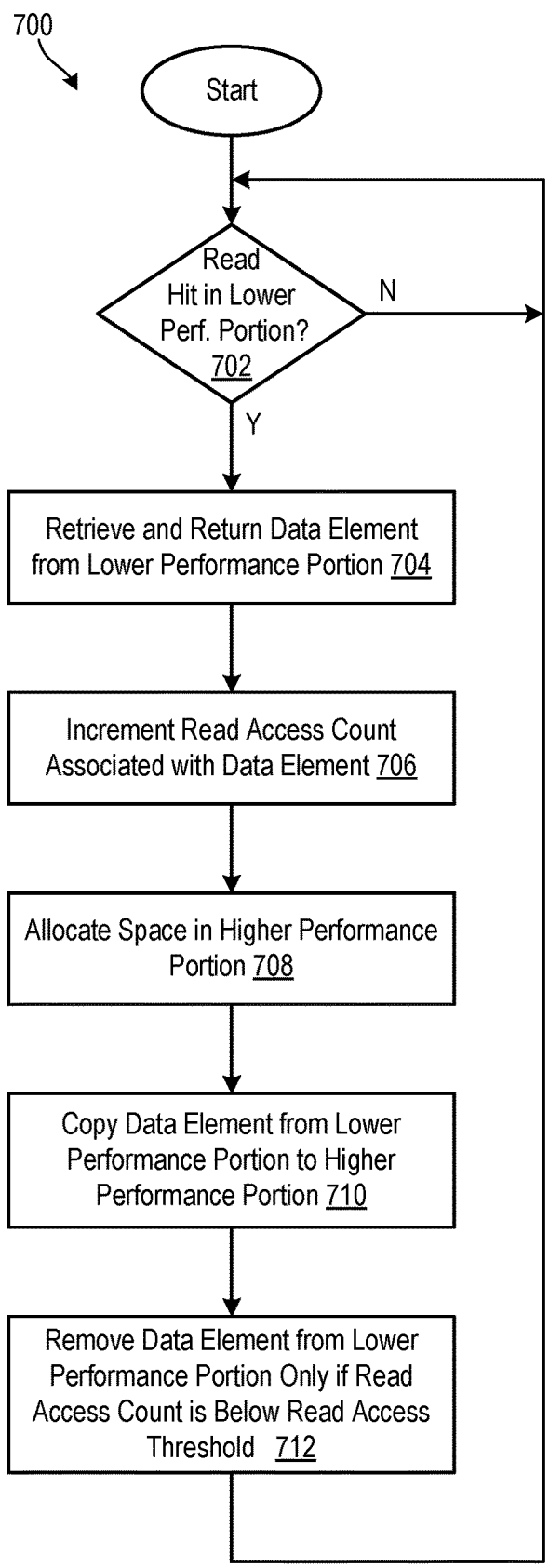
FIG. 7 is a flow diagram showing an alternative embodiment of a method that may be executed in response to a read hit in the lower performance portion.

Referring to FIG. 7, an alternative embodiment of a method 700 that may be executed in response to a read hit in the lower performance portion 218*b* is illustrated. This method 700 may be executed in place of the method 600 of FIG. 6. Each of the steps 702, 704, 706, 708, 710, are similar or identical to those disclosed in FIG. 6 except for the final step 712. In step 712, the alternative method 700 removes 712 the data element from the lower performance portion 218*b* only if the read access count 306*b* associated with the data element is below a selected threshold. This step 712 preserves a second copy of the data element in the lower performance portion 218*b* if the data element is read frequently. In the event the data element is demoted from the higher performance portion 218*a* at a future point in time, a copy of the data element will still reside in the lower performance portion 218*b*. This eliminates or reduces the need to copy the data element from the higher performance portion 218*a* to the lower performance portion 218*b* when the data element is demoted, which reduces processor utilization.

Figure 8:
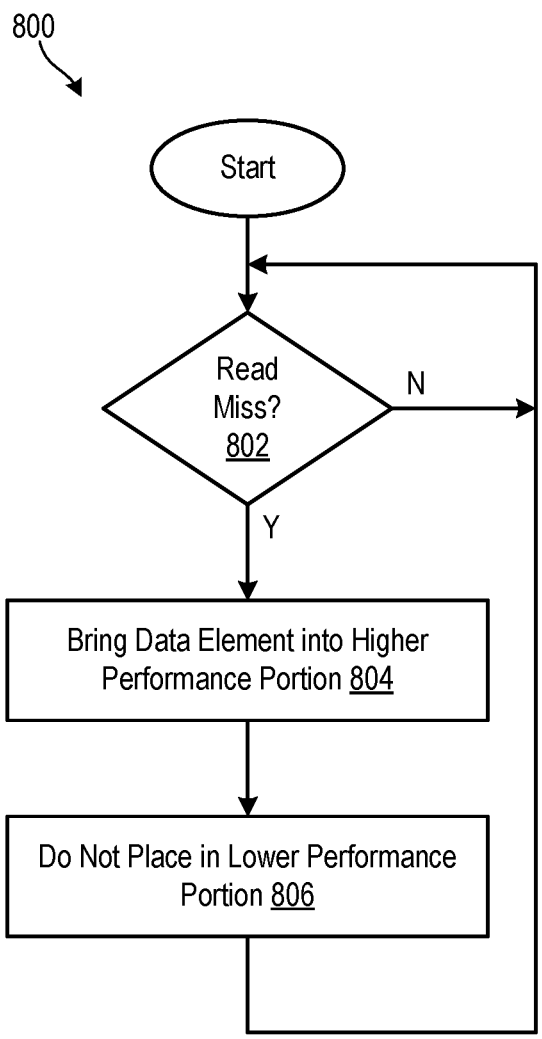
FIG. 8 is a flow diagram showing one embodiment of a method that may be executed in response to a read miss.

Referring to FIG. 8, one embodiment of a method 800 that may be executed in response to a read miss is illustrated. A read miss may occur when a requested data element cannot be found in either the higher performance portion 218*a* or the lower performance portion 218*b* of the heterogeneous cache 218. As shown, if a read miss occurs at step 802, the method 800 brings 804 the data element into the higher performance portion 218*a* of the heterogeneous cache 218 from backend storage drives 204. The method 800 does not place 806 the data element in the lower performance portion 218*b* at this time.

Figure 9:
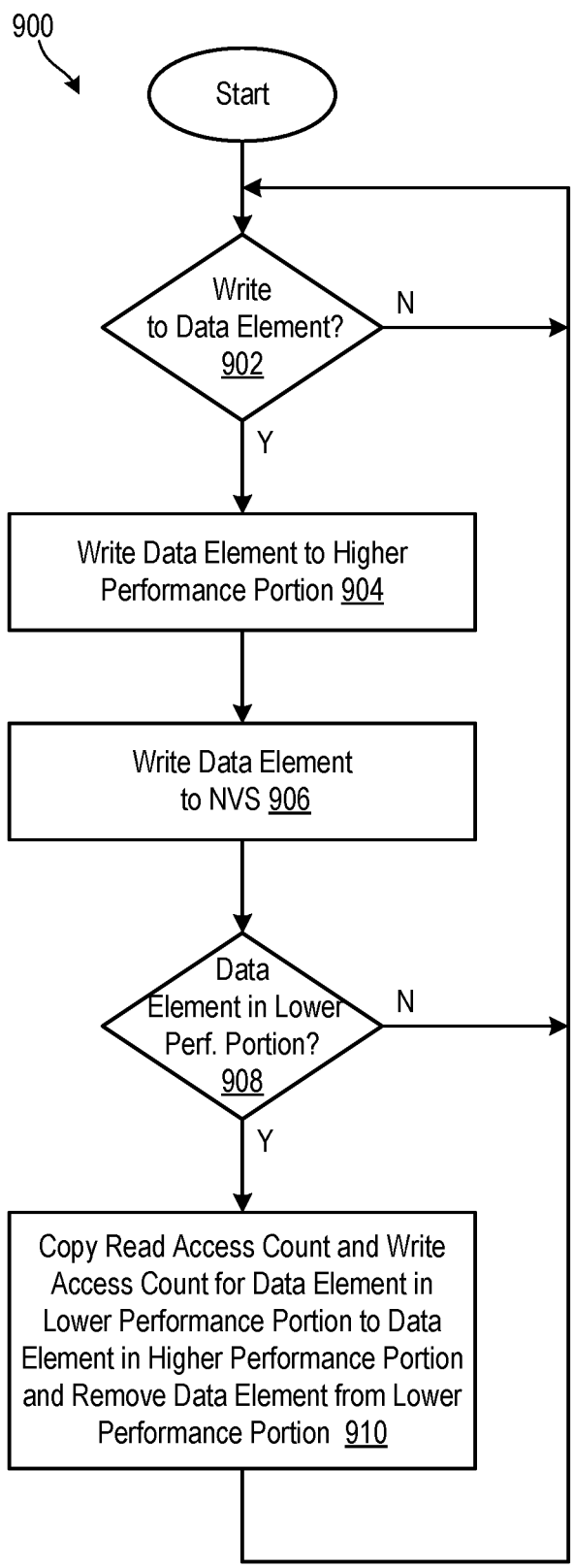
FIG. 9 is a flow diagram showing one embodiment of a method that may be executed in response to a write.

Referring to FIG. 9, one embodiment of a method 900 that may be executed in response to updating a data element in the heterogeneous cache 218 is illustrated. As shown, the method 900 determines 902 whether a write to a data element is requested. If so, the method 900 writes 904 the data element to the higher performance portion 218*a* of the heterogeneous cache 218. The method 900 also writes 906 the data element to the NVS 220 for purposes of redundancy as was previously described.

At this point, the method 900 determines 908 whether the data element (or a previous version thereof) is contained in the lower performance portion 218*b*. If the data element is stored in the lower performance portion 218*b*, the method 900 copies 910 statistics 304*b* (i.e., the read access count 306*b* and write access count 308*b*) associated with the data element from the lower performance portion 218*b* to the higher performance portion 218*a*. The method 900 then removes 910 the data element from the lower performance portion 218*b*.

Figure 10:
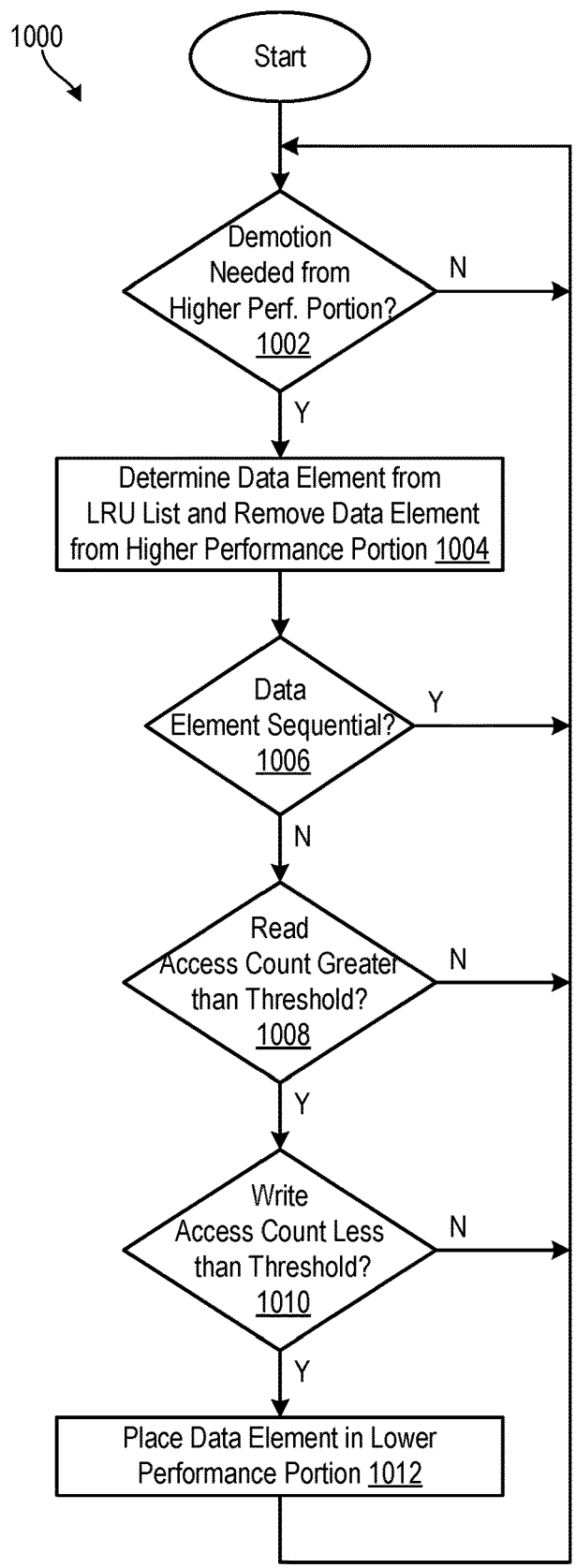
FIG. 10 is a flow diagram showing one embodiment of a method that may be executed when a data element is demoted from the higher performance portion.

Referring to FIG. 10, one embodiment of a method 1000 that may be executed when a data element is demoted (i.e., evicted) from the higher performance portion 218*a* is illustrated. Such a demotion may occur when space is needed in the higher performance portion 218*a* to accommodate additional data elements. As shown, the method 1000 initially determines 1002 whether data needs to be demoted from the higher performance portion 218*a*. If so, the method 1000 analyzes the LRU list 302*a* associated with the higher performance portion 218*a* to determine 1004 the least recently used data element that is in line to be removed from the higher performance portion 218*a*. The method 1000 then removes 1004 this data element from the higher performance portion 218*a*.

At this point, the method 1000 determines 1006 whether the data element that was removed from the higher performance portion 218*a* is sequential data. If so, nothing further is performed since it would be disadvantageous to add sequential data to the lower performance portion 218*b*. If the data element is not sequential, the method 1000 determines 1008 whether the read access count 306*a* associated with the data element is greater than a specified threshold and determines 1010 whether the write access count 308*a* associated with the data element is less than a specified threshold. If both of these conditions are true, the method 1000 places 1012 the data element that was demoted from the higher performance portion 218*a* in the lower performance portion 218*b*. In essence, the method 1000 places 1012 data elements in the lower performance portion 218*b* if the data elements are read frequently (thereby enhancing future read performance for the data elements) but written to infrequently since excessive writes to the data elements may place excessive wear on the lower performance portion 218*b*.

Figure 11:
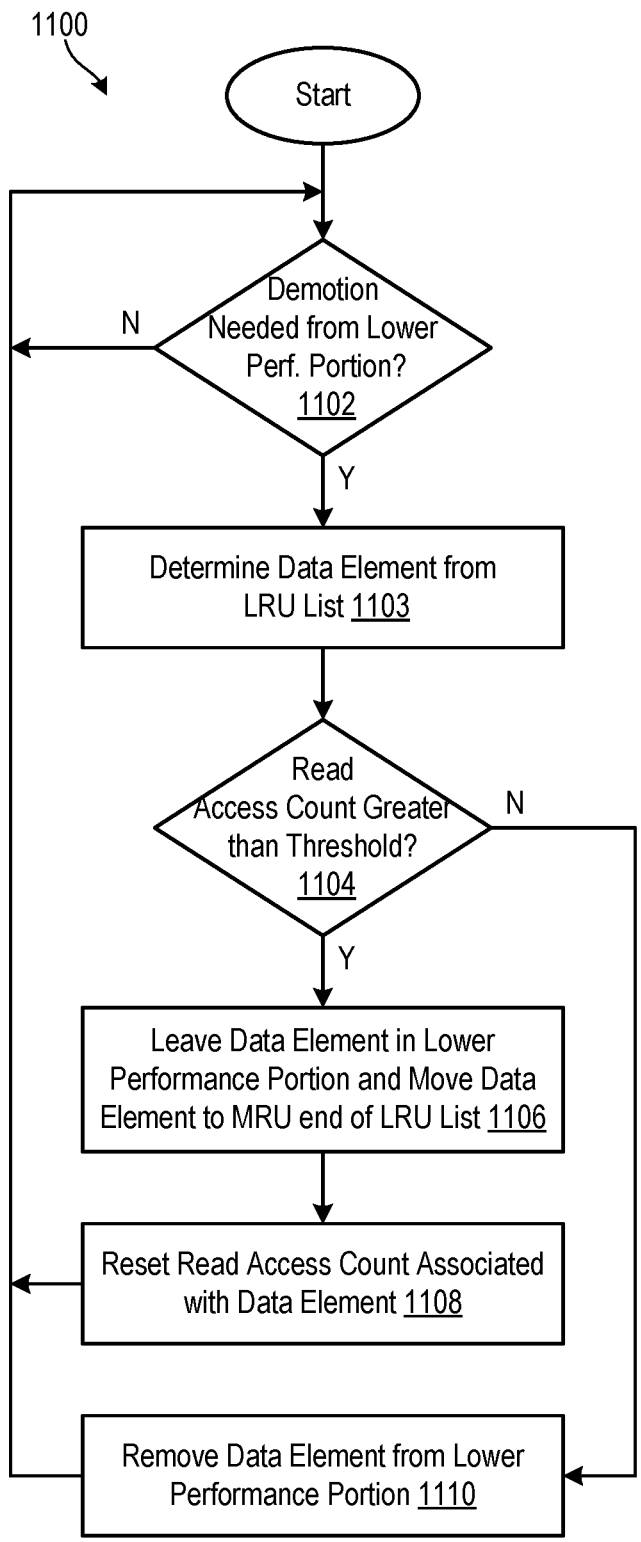
FIG. 11 is a flow diagram showing one embodiment of a method that may be executed when a data element is demoted from the lower performance portion.

Referring to FIG. 11, one embodiment of a method 1100 that may be executed when a data element is demoted (i.e., evicted) from the lower performance portion 218*b* is illustrated. Such a demotion may occur when space is needed in the lower performance portion 218*b*. As shown, the method 1100 initially determines 1102 whether data needs to be demoted from the lower performance portion 218*b*. If so, the method 1100 analyzes the LRU list 302*b* associated with the lower performance portion 218*b* to determine 1103 which data element is in line to be removed from the lower performance portion 218*b*.

At this point, the method 1100 determines 1104 whether the read access count 306*b* for the data element that is line to be removed is greater than a threshold (to determine if the data element is read frequently). If the read access count 306*b* is above the threshold, the method 1100 leaves 1106 the data element in the lower performance portion 218*b* and moves a reference to the data element to the MRU (most recently used) end of the LRU list 302*b*. In other words, the method 1100 does not remove the data element from the lower performance portion 218*b* since it is determined to be read frequently and would benefit from being retained in the lower performance portion 218*b*. The method 1100 also resets 1108 (e.g., sets to zero) the read access count 306*b* associated with the data element. The method 1100 then returns to the top (i.e., step 1102) where it may analyze the next data element in line to be removed from the lower performance portion 218*b*.

On the other hand, if, at step 1104, the read access count 306*b* associated with the data element is not above the threshold, the method 1100 removes 1110 the data element from the lower performance portion 218*b*.

Figure 12:
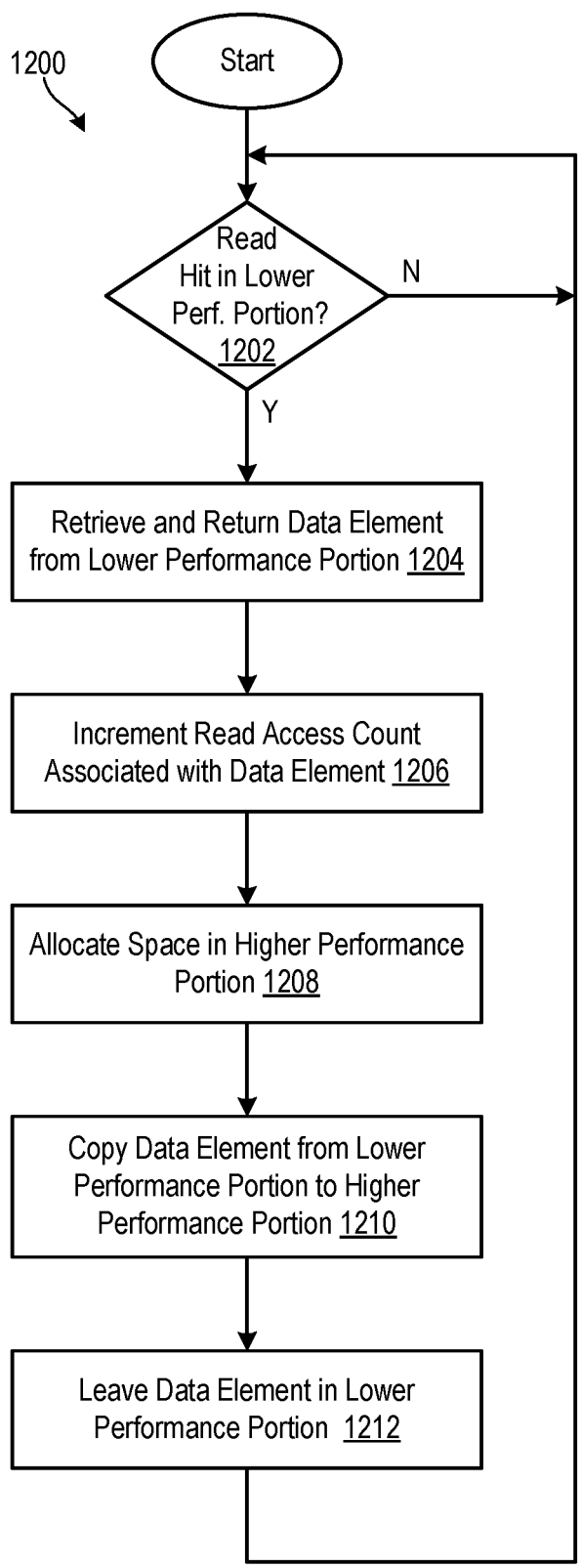
FIG. 12 is a flow diagram showing an alternative embodiment of a method that may be executed in response to a read hit in the lower performance portion.
Figure 13:
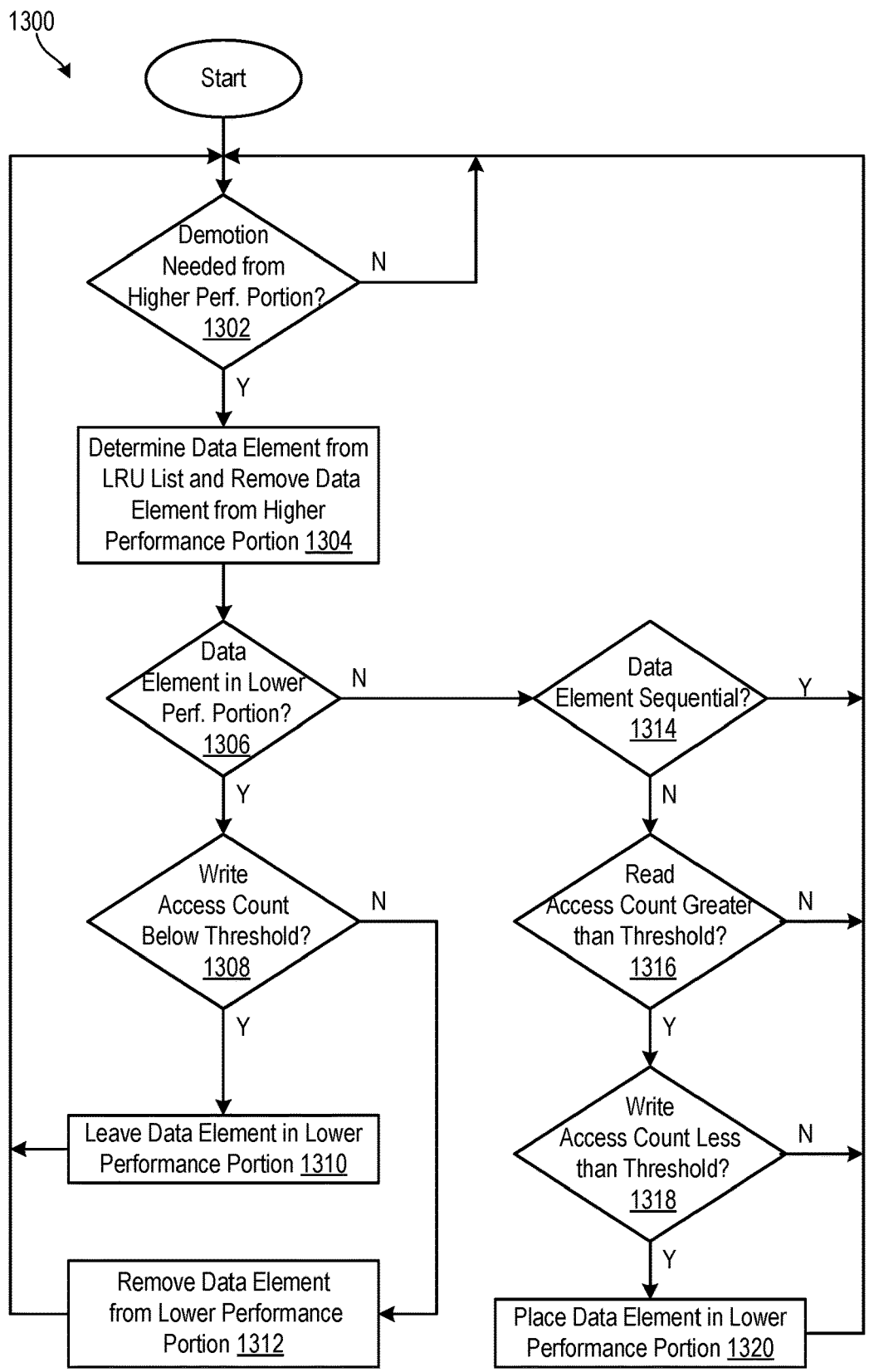
FIG. 13 is a flow diagram showing an alternative embodiment of a method that may be executed when a data element is demoted from the higher performance portion.

Referring generally to FIGS. 12 and 13, as was previously mentioned, the methods illustrated in FIGS. 5 through 11 are generally configured to maintain a single copy of a data element in the heterogeneous cache 218. That is, if a data element resides in the higher performance portion 218*a*, it will generally not reside in (or will be removed from) the lower performance portion 218*b*, and vice versa. This provides the best overall cache capacity at the expense of having to copy data elements from the higher performance portion 218*a* to the lower performance portion 218*b* when data elements are demoted from the higher performance portion 218*a*, which may increase processor utilization. Thus, a tradeoff exists between cache capacity and processor utilization.

In certain embodiments, the methods illustrated in FIGS. 5 through 11 may be modified to maintain, for the most part, a copy of a data element in both the higher performance portion 218*a* and the lower performance portion 218*b*. Although this may reduce overall cache storage capacity, it may advantageously reduce processor utilization by reducing the need to copy data elements between the higher performance portion 218*a* and the lower performance portion 218*b*.

FIG. 12 is a flow diagram showing an alternative method 1200 that may be executed in response to a read hit in the lower performance portion 218*b*. This method 1200 may be executed in environments where duplicate copies of data elements are maintained in the higher performance portion 218*a* and the lower performance portion 218*b*. This method 1200 may be used to replace the method 600 described in FIG. 6, which may be used in environments where only a single copy is maintained.

As shown, the method 1200 determines 1202 whether a read hit has occurred in the lower performance portion 218*b*. If so, the method 1200 retrieves 1204 and returns 1206 a data element associated with the read request from the lower performance portion 218*b* to an originator of the read request. The method 1200 increments 1206 the read access count 306*b* associated with the data element.

In response to the read hit, the method 1200 allocates 1208 space in the higher performance portion 218*a* that is sufficient to accommodate the data element. The method 1200 then copies 1210 the data element associated with the read request from the lower performance portion 218*b* to the higher performance portion 218*a*. The data element may be left 1212 in the lower performance portion 218*b*. This may provide duplicate copies of the data element in the higher performance portion 218*a* and the lower performance portion 218*b*.

FIG. 13 is a flow diagram showing an alternative method 1300 that may be executed when a data element is demoted from the higher performance portion 218*a*. This method 1300 may also be executed in environments where duplicate copies of data elements are maintained in the higher performance portion 218*a* and the lower performance portion 218*b*. This method 1300 may be used to replace the method 1000 described in FIG. 10, which may be used in environments where only a single copy is maintained.

As shown, the method 1300 initially determines 1302 whether data needs to be demoted from the higher performance portion 218*a*. If so, the method 1300 analyzes the LRU list 302*a* associated with the higher performance portion 218*a* to determine 1304 which data element is in line to be removed from the higher performance portion 218*a*. The method 1300 then removes 1304 this data element from the higher performance portion 218*a*.

The method 1300 then determines 1306 whether the data element that was removed from the higher performance portion 218*a* also resides in the lower performance portion 218*b*. If so, the method 1300 determines 1308 whether a write access count 308*b* associated with the data element is below a threshold. In essence, this step 1308 determines whether the data element is updated frequently. If the data element is not updated frequently (i.e., the write access count 308*b* for the data element is below the threshold), the data element is left 1310 in the lower performance portion 218*b* since the data element will not place excessive wear on the lower performance portion 218*b*. On the other hand, if the data element is updated frequently (i.e., the write access count 308*b* for the data element is above the threshold), the method 1300 removes 1312 the data element from the lower performance portion 218*b*.

If, at step 1306, the data element is not in the lower performance portion 218*b*, the method 1300 determines 1314 whether the data element that was removed from the higher performance portion 218*a* is sequential data. If so, nothing is changed since it would not be advantageous to add the data element to the lower performance portion 218*b*. If the data element is not sequential, the method 1300 determines 1316 whether a read access count 306*b* associated with the data element is greater than a specified threshold and determines 1318 whether a write access count 308*b* associated with the data element is less than a specified threshold. If so, the method 1300 places 1320 the data element that was demoted from the higher performance portion 218*a* in the lower performance portion 218*b*. In essence, the method 1300 places 1320 demoted data elements in the lower performance portion 218*b* if the data elements are read frequently (thereby enhancing future read performance for the data elements) but not updated frequently since excessive writes may place excessive wear on the lower performance portion 218*b* if it is implemented in a memory type (e.g., SCM) having write cycle limits.

Figure 14:
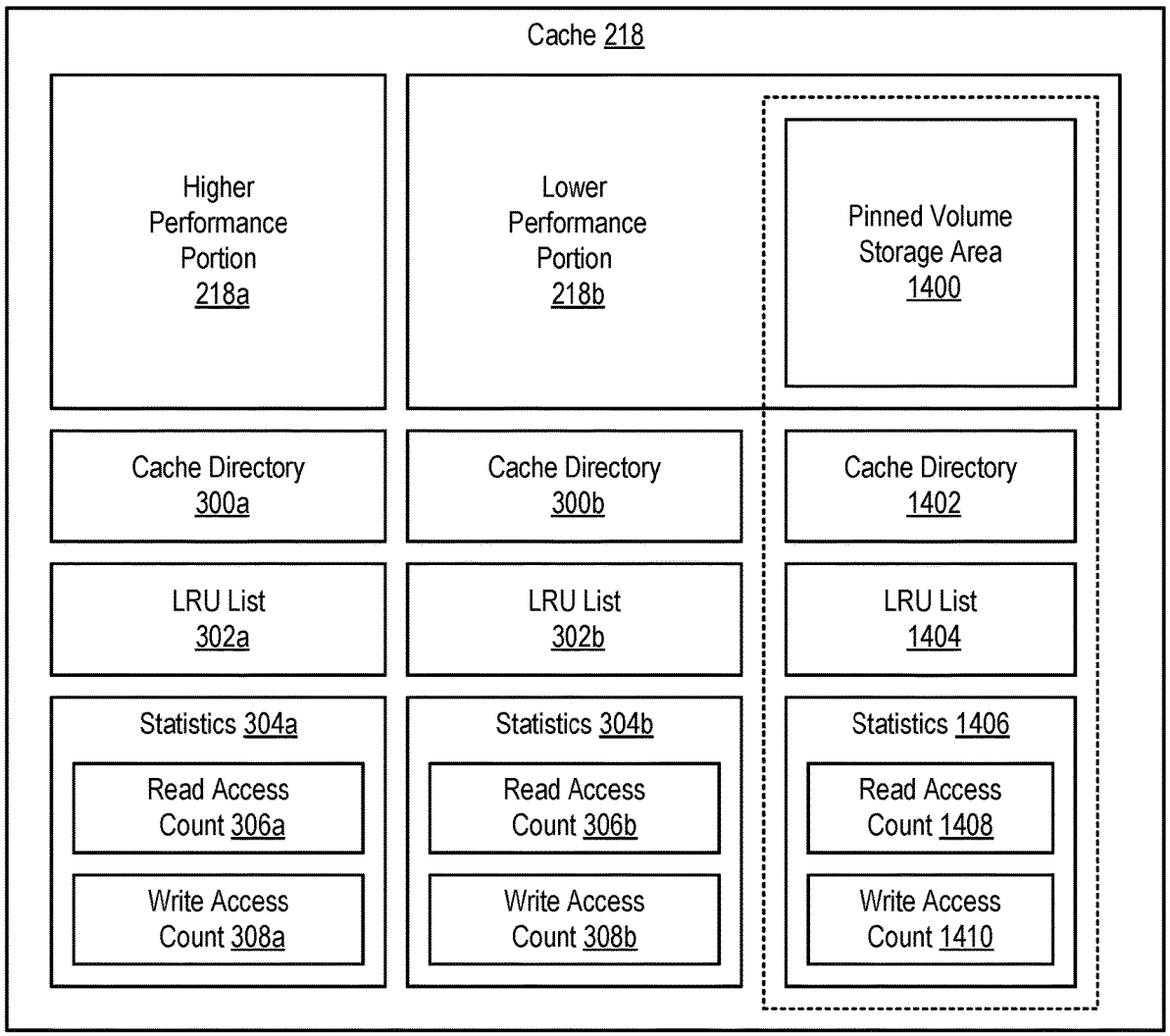
FIG. 14 is a high-level block diagram showing a pinned volume storage area within a lower performance portion of the cache.

Referring to FIG. 14, in certain embodiments, storage space 1400 may be reserved in the lower performance portion 218*b* to accommodate what are referred to herein as "pinned" volumes. These pinned volumes may be given higher priority than other volumes in the cache 218. The storage space 1400 may be referred to herein as a "pinned volume storage area 1400" or "pinned storage area 1400." The pinned volumes may remain in the pinned volume storage area 1400 to generate higher cache hit ratios and thus better I/O performance than other non-pinned volumes.

Like the higher performance portion 218*a* and lower performance portion 218*b* previously described, the pinned volume storage area 1400 may include its own cache directory 1402 and LRU list 1404. Separate statistics 1406, such as a read access count 1408 and write access count 1410, may be maintained for each storage element (e.g., pinned track) in the pinned volume storage area 1400. The cache directory 1402 may maintain a record of all pinned storage elements in the pinned volume storage area 1400. In certain embodiments, the cache directory 1402 is stored in the higher performance portion 218*a* to enable quick access.

Each entry in the cache directory 1402 may point to a control block that indicates whether a pinned storage element in the pinned volume storage area 1400 is valid or invalid, as well as store location information for the storage element in the pinned volume storage area 1400. Each time a pinned storage element is read in the pinned volume storage area 1400, its read access count 1408 may be incremented. Similarly, each time a pinned storage element is written to in the pinned volume storage area 1400, its write access count 1410 may be incremented. As pinned storage elements are added to or accessed in the storage area 1400, the pinned storage elements may be added to a most recently used (MRU) end of the LRU list 1404. Similarly, when storage space is needed in the storage area 1400, pinned storage elements at an LRU end of the LRU list 1404 may be demoted from the storage area 1400 and removed from the LRU end.

Figure 15:
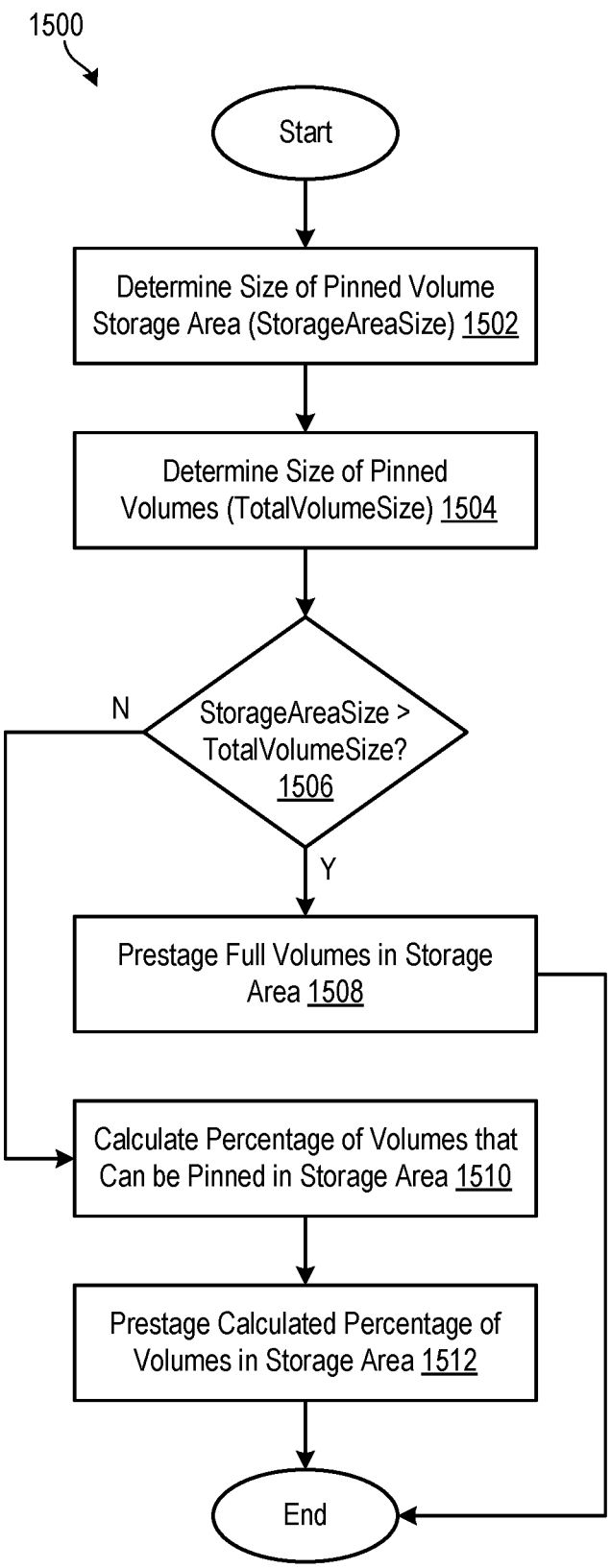
FIG. 15 is a flow diagram showing one embodiment of a method for prestaging data in the pinned volume storage area.

Referring to FIG. 15, upon identifying volumes to be pinned in the pinned volume storage area 1400, the volumes may be pre-staged in the storage area 1400, such as at initial microprogram load (IML) time or when a user issues a command to pin certain volumes or to change which volumes are pinned. FIG. 15 shows one embodiment of a method 1500 to prestage storage elements in the pinned volume storage area 1400 from backend storage drives 204. As shown, the method 1500 initially determines 1502 a size of the pinned volume storage area 1400 in the lower performance portion 218*b*. The method 1500 also determines 1504 a total size of all volumes designated to be pinned in the storage area 1400. If, at step 1506, the size of the pinned volume storage area 1400 is greater than the total size of the pinned volumes, then the storage area 1400 is sufficiently large to accommodate all of the pinned volumes. In such a case, the method 1500 prestages 1508 full volumes in the storage area 1400.

If, at step 1506, the size of the pinned volume storage area 1400 is less than the total size of the pinned volumes, then the pinned volumes will not entirely fit in the pinned volume storage area 1400. In such a case, the method 1500 determines a portion of each pinned volume that will fit in the storage area 1400. For example, in the illustrated embodiment, the method 1500 calculates 1510 a percentage of each pinned volume that can fit in the storage area 1400 by dividing the total size of the pinned volumes by the size of the storage area 1400. For example, if the storage area 1400 is one terabyte in size and the total size of the pinned volumes is two terabytes, fifty percent of the pinned volumes may be stored in the storage area 1400. In such a case, the method 1500 prestages 1512 fifty percent of each pinned volume in the storage area 1400.

When prestaging 1512 a portion of the pinned volumes in the pinned volume storage area 1400, the volumes may be prestaged in parallel to ensure that storage elements of the pinned volumes are substantially evenly distributed through the LRU list 1404. This will ensure that storage elements of each pinned volume are demoted from the storage area 1400 in an even or substantially even manner as they are selected from an LRU end of the LRU list 1404.

Figure 16:
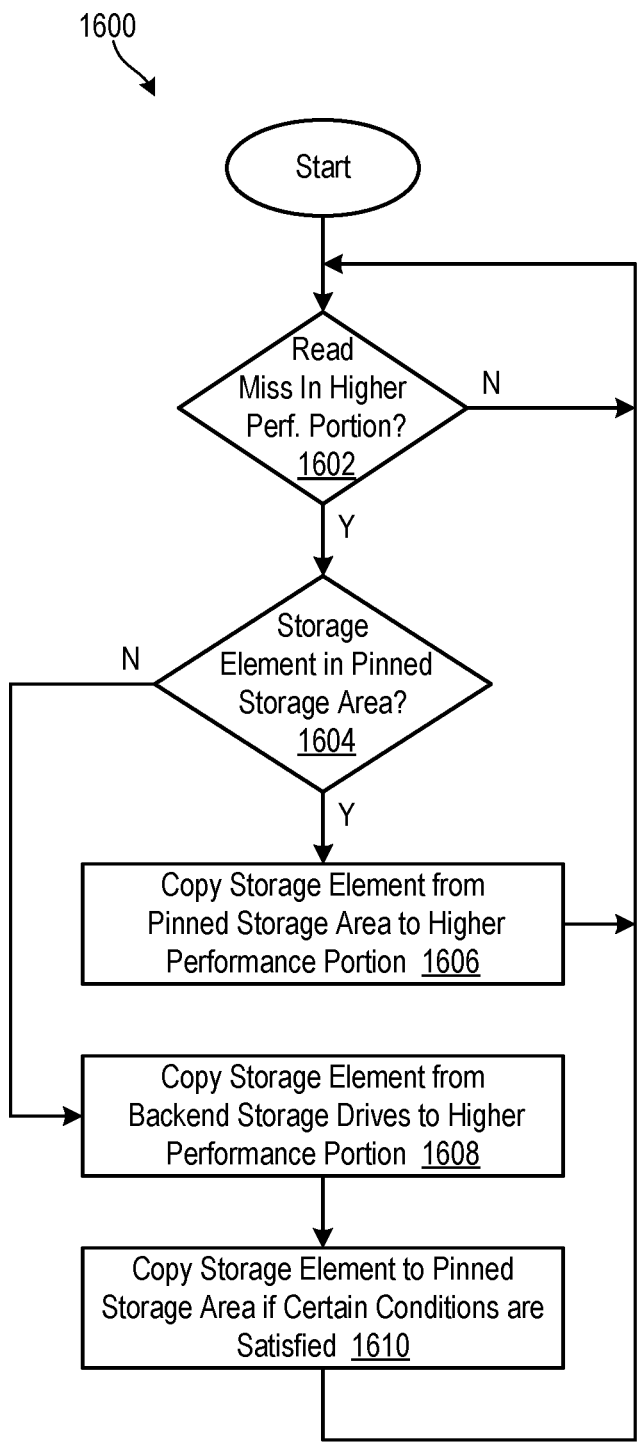
FIG. 16 is a flow diagram showing one embodiment of a method for handling a read miss in the heterogeneous cache of FIG. 14.

Referring to FIG. 16, one embodiment of a method 1600 for handling a read miss in a higher performance portion 218*a* of the heterogeneous cache 218 is illustrated. As shown, the method 1600 initially determines 1602 whether a read miss has occurred in the higher performance portion 218*a*. If so, the method 1600 determines 1604 whether the storage element for which the read miss occurred is present in the pinned volume storage area 1400. If so, the method 1600 copies 1606 the storage element from the pinned volume storage area 1400 to the higher performance portion 218a. If the storage element is not in the pinned volume storage area 1400, the method 1600 copies 1608 the storage element from backend storage drives 204 to the higher performance portion 218a. The method 1600 may also copy 1610 the storage element to the pinned volume storage area 1400 if certain conditions are satisfied. For example, if the pinned storage element is invalid in the cache directory 1402 and a designated amount of time has passed since the storage element was last updated, the method 1600 may copy 1610 the storage element to the pinned volume storage area 1400. Alternatively, or additionally, if the storage element does not exist in the cache directory 1402, the method 1600 may copy 1610 the storage element to the pinned volume storage area 1400 and add the storage element to the cache directory 1402.

Figure 17:
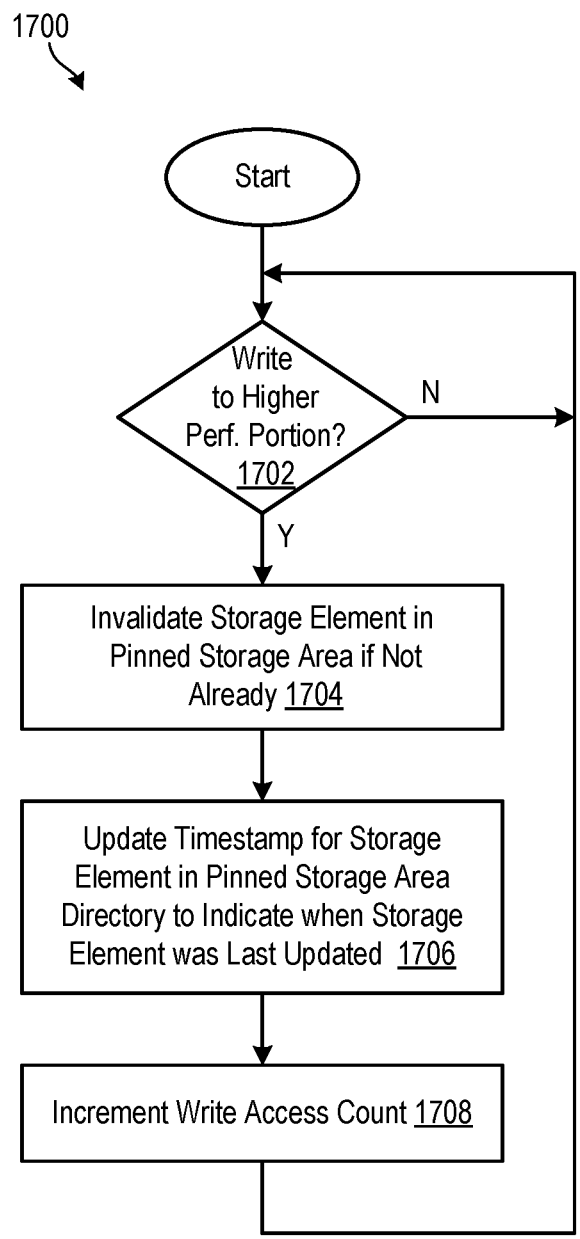
FIG. 17 is a flow diagram showing one embodiment of a method for handling a write in the heterogeneous cache of FIG. 14.

Referring to FIG. 17, one embodiment of a method 1700 that is executed when a pinned storage element is written to the higher performance portion 218a is illustrated. As shown, when a pinned storage element is written to the higher performance portion 218a, the method 1700 invalidates 1704 the storage element in the cache directory 1402 of the pinned volume storage area 1400 if it is not already invalid (since the write has updated the copy of the storage element in the pinned volume storage area 1400). The method 1700 then updates 1706 a timestamp associated with the pinned storage element in the cache directory 1402 to indicate when the storage element was updated. The method 1700 updates 1708 the write access count 308a associated with the storage element in the higher performance portion 218a.

Figure 18:
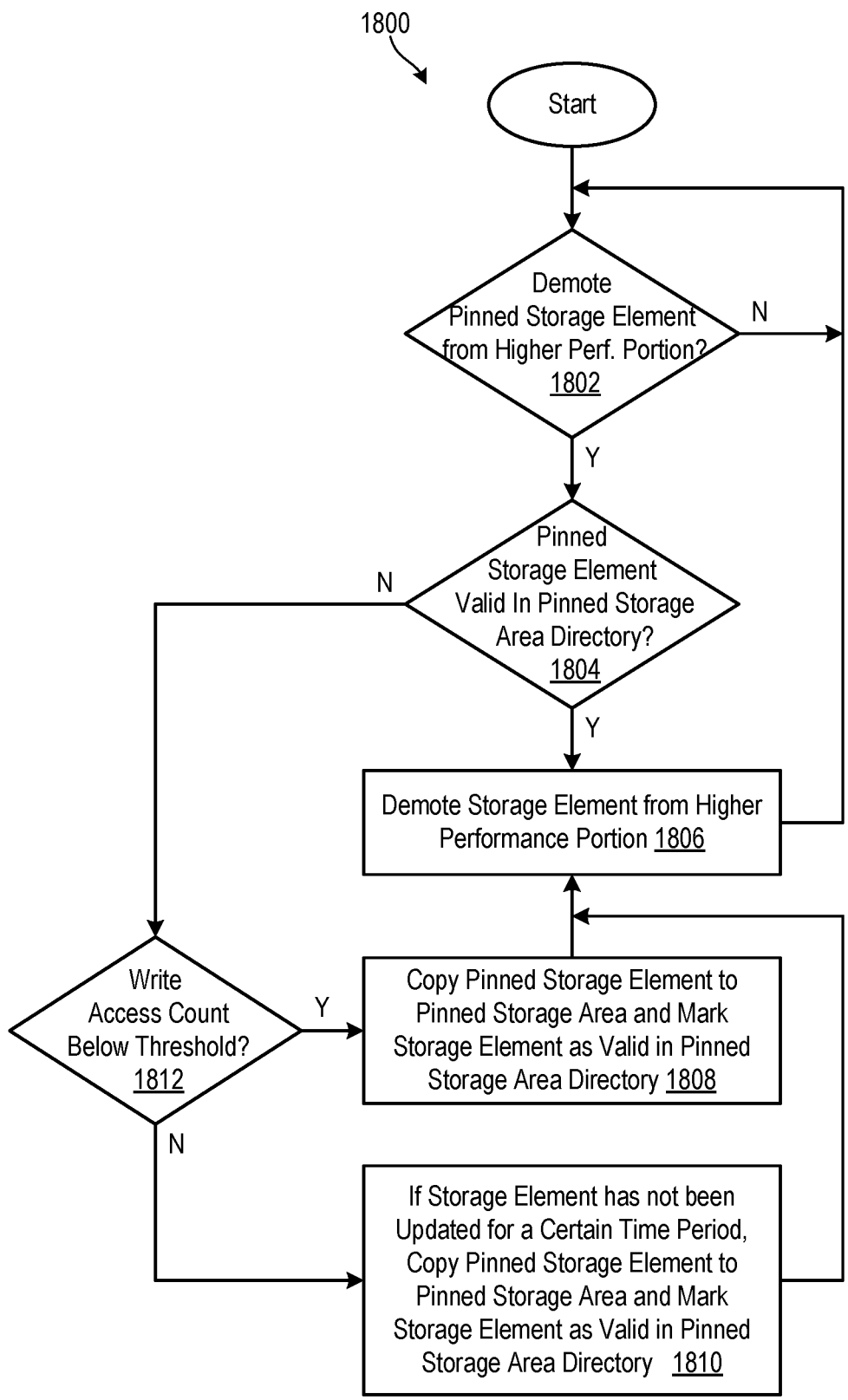
FIG. 18 is a flow diagram showing one embodiment of a method for demoting a pinned storage element from the higher performance portion in the heterogeneous cache of FIG. 14.

Referring to FIG. 18, one embodiment of a method 1800 for demoting a pinned storage element from the higher performance portion 218a is illustrated. As shown, at step 1802, when a pinned storage element is in line to be demoted from the higher performance portion 218a (as indicated in the LRU list 302a of the higher performance portion 218a), the method 1800 checks 1804 whether the storage element is valid in the cache directory 1402 of the pinned volume storage area 1400. If the storage element is valid, the method 1800 demotes 1806 (i.e., evicts 1806) the storage element from the higher performance portion 218a.

If, on the other hand, a valid copy of the storage element does not exist in the pinned volume storage area 1400, the method 1800 determines 1812 whether a write access count 308a associated with the storage element is below a certain threshold (indicating that the storage element is not updated frequently). If so, the method 1800 copies 1808 the storage element to the pinned volume storage area 1400 and marks 1808 the storage element as valid in the cache directory 1402 of the storage area 1400. On the other hand, if the write access count 308a is not below the threshold (indicating the storage element is updated frequently), the method 1800 determines 1810 if the storage element has not been updated for a certain time period and, if so, copies 1810 the pinned storage element to the pinned volume storage area 1400 and marks 1810 the storage element as valid in the cache directory 1402 associated with the storage area 1400. The method 1800 then demotes 1806 the storage element from the higher performance portion 218a.

Figure 19:
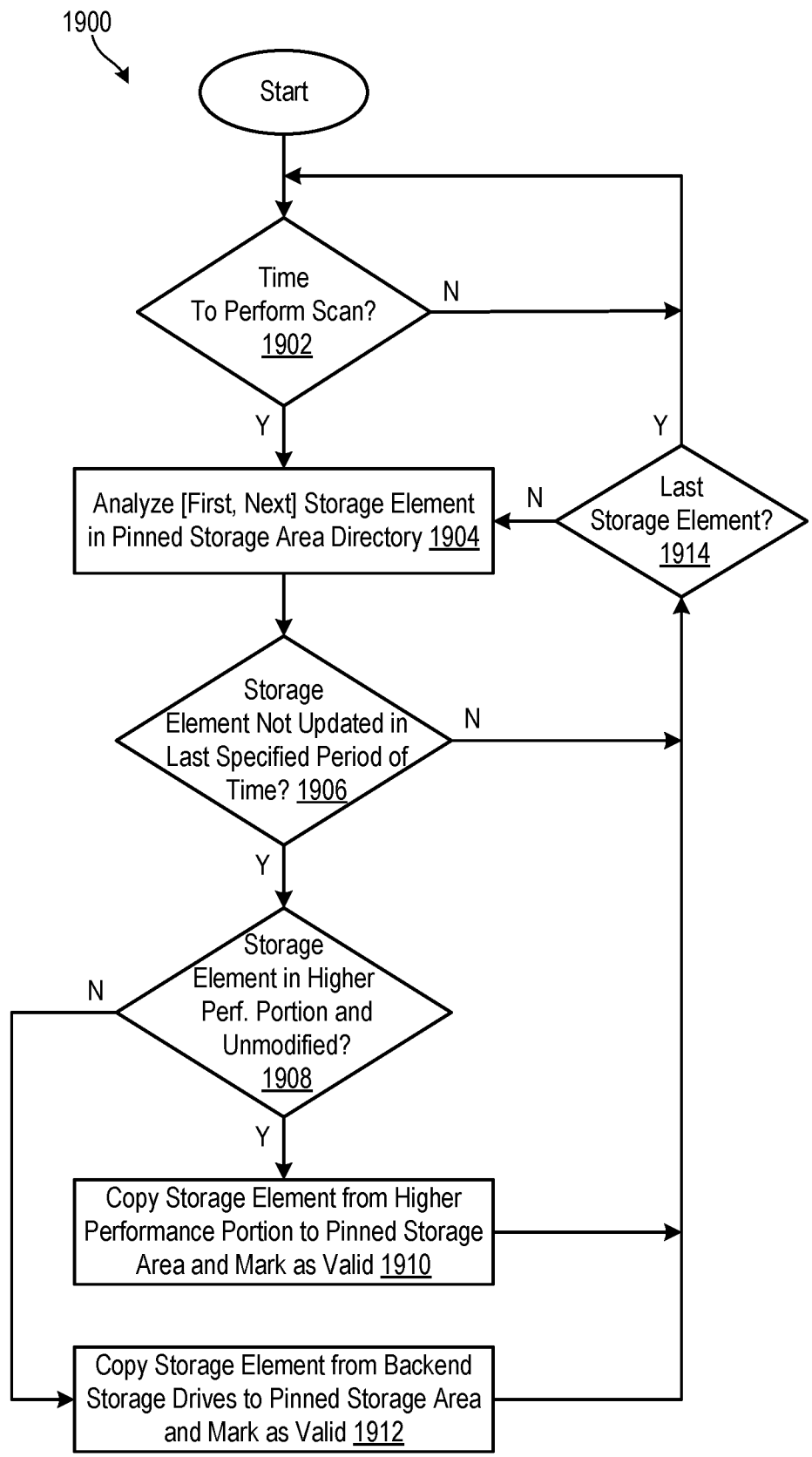
FIG. 19 is a flow diagram showing one embodiment of a method for periodically scanning and repopulating the pinned volume storage area.

To ensure that the pinned volume storage area 1400 is populated with valid copies of storage elements from the pinned volumes, systems and methods in accordance with the invention may periodically scan the pinned volume storage area 1400 and populate it with valid copies of the pinned storage elements. FIG. 19 is a flow diagram showing one embodiment of a method 1900 for periodically (e.g., such as every fifteen minutes) scanning and repopulating the pinned volume storage area 1400.

As shown, the method 1900 determines 1902 whether it is time to perform a scan. If so, the method 1900 analyzes 1904 a first storage element in the cache directory 1402 of the pinned volume storage area 1400. If, at step 1906, the storage element has been updated in a last specified period of time, the storage element is not a candidate for storage in the pinned volume storage area 1400 since it is updated too frequently and will likely place unwanted wear and tear on the lower performance portion 218b (which may be made up of SCM). In such a scenario, the method 1900 proceeds to steps 1914 and 1904 to analyze the next storage element in the cache directory 1402.

On the other hand, if, at step 1906, the storage element has not been updated in the last specified time period, the method 1900 determines 1908 whether the storage element resides in the higher performance portion 218a and is unmodified. If so, the method 1900 copies 1910 the storage element from the higher performance portion 218a to the pinned volume storage area 1400. The storage element is then marked 1910 as valid in the cache directory 1402. If the storage element does not reside in the higher performance portion 218a and/or the storage element has been modified, the method 1900 copies 1912 the storage element from backend storage drives 204 to the pinned volume storage area 1400. The storage element is then marked 1912 as valid in the cache directory 1402. The method 1900 proceeds by way of step 1914 until all storage elements in the cache directory 1402 are analyzed.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for pinning selected volumes within a heterogeneous cache, the method comprising:
   maintaining a heterogeneous cache comprising a higher performance portion and a lower performance portion;
   receiving a list of pinned volumes that are provided higher priority than other volumes within the heterogeneous cache;
   dedicating, within the lower performance portion, a storage area to accommodate the pinned volumes; and
   prestaging, within the storage area, the pinned volumes.

2. The method of claim 1, further comprising determining a size of the storage area and a size of the pinned volumes.

3. The method of claim 2, further comprising comparing the size of the storage area to the size of the pinned volumes to determine a portion of each pinned volume that can be stored in the storage area.

4. The method of claim 3, wherein prestaging the pinned volumes comprises prestaging the determined portions of the pinned volumes in the storage area.

5. The method of claim 1, further comprising providing a least recently used (LRU) list for the storage area, the LRU list indicating an order in which storage elements of the pinned volumes are demoted from the storage area.

6. The method of claim 5, wherein prestaging the pinned volumes comprises recording the storage elements in the LRU list.

7. The method of claim 6, wherein recording the storage elements in the LRU list comprises substantially equally distributing the storage elements from each pinned volume in the LRU list.

8. A computer program product for pinning selected volumes within a heterogeneous cache, the computer program product comprising a non-transitory computer-readable storage medium having computer-usable program code embodied therein, the computer-usable program code configured to perform the following when executed by at least one processor:
   maintain a heterogeneous cache comprising a higher performance portion and a lower performance portion;
   receive a list of pinned volumes that are provided higher priority than other volumes within the heterogeneous cache;
   dedicate, within the lower performance portion, a storage area to accommodate the pinned volumes; and
   prestage, within the storage area, the pinned volumes.

9. The computer program product of claim 8, wherein the computer-usable program code is further configured to determine a size of the storage area and a size of the pinned volumes.

10. The computer program product of claim 9, wherein the computer-usable program code is further configured to compare the size of the storage area to the size of the pinned volumes to determine a portion of each pinned volume that can be stored in the storage area.

11. The computer program product of claim 10, wherein prestaging the pinned volumes comprises prestaging the determined portions of the pinned volumes in the storage area.

12. The computer program product of claim 8, wherein the computer-usable program code is further configured to provide a least recently used (LRU) list for the storage area, the LRU list indicating an order in which storage elements of the pinned volumes are demoted from the storage area.

13. The computer program product of claim 12, wherein prestaging the pinned volumes comprises recording the storage elements in the LRU list.

14. The computer program product of claim 13, wherein recording the storage elements in the LRU list comprises substantially equally distributing the storage elements from each pinned volume in the LRU list.

15. A system for pinning selected volumes within a heterogeneous cache, the system comprising:
   at least one processor; and
   at least one memory device operably coupled to the at least one processor and storing instructions for execution on the at least one processor, the instructions causing the at least one processor to:
      maintain a heterogeneous cache comprising a higher performance portion and a lower performance portion;
      receive a list of pinned volumes that are provided higher priority than other volumes within the heterogeneous cache;
      dedicate, within the lower performance portion, a storage area to accommodate the pinned volumes; and
      prestage, within the storage area, the pinned volumes.

16. The system of claim 15, wherein the instructions further cause the at least one processor to determine a size of the storage area and a size of the pinned volumes.

17. The system of claim 16, wherein the instructions further cause the at least one processor to compare the size of the storage area to the size of the pinned volumes to determine a portion of each pinned volume that can be stored in the storage area.

18. The system of claim 17, wherein prestaging the pinned volumes comprises prestaging the determined portions of the pinned volumes in the storage area.

19. The system of claim 15, wherein the instructions further cause the at least one processor to provide a least recently used (LRU) list for the storage area, the LRU list indicating an order in which storage elements of the pinned volumes are demoted from the storage area.

20. The system of claim 19, wherein prestaging the pinned volumes comprises recording the storage elements in the LRU list, wherein recording the storage elements in the LRU list comprises substantially equally distributing the storage elements from each pinned volume in the LRU list.

* * * * *